United States Patent [19]

Berger et al.

[11] 3,919,283

[45] Nov. 11, 1975

[54] SULFATE DERIVATIVES OF POLYGLYCOL COMPOUNDS

[75] Inventors: Alfred Berger; Heinz Abel, both of Reinach, Basel, Switzerland

[73] Assignee: Ciba-Geigy AG, Basel, Switzerland

[22] Filed: Aug. 14, 1973

[21] Appl. No.: 388,314

Related U.S. Application Data

[63] Continuation of Ser. No. 833,866, June 3, 1969, abandoned, which is a continuation of Ser. No. 533,774, March 14, 1966, abandoned.

[30] Foreign Application Priority Data

Mar. 18, 1965 Switzerland............................ 3812/65
July 29, 1965 Switzerland........................ 10691/65

[52] U.S. Cl.......... 260/458; 260/481 R; 260/561 A; 260/567.6 M; 260/567.6 P; 8/1 P; 8/1 S
[51] Int. Cl.²........................................ C07C 141/02
[58] Field of Search...................... 260/458, 481 R

[56] References Cited
FOREIGN PATENTS OR APPLICATIONS

| | | |
|---|---|---|
| 355,457 | 8/1961 | Switzerland......................... 260/458 |
| 902,374 | 8/1962 | United Kingdom................. 260/458 |
| 852,548 | 10/1960 | United Kingdom................. 260/458 |
| 888,661 | 1/1962 | United Kingdom................. 260/458 |
| 465,200 | 4/1937 | United Kingdom................. 260/458 |
| 310,412 | 8/1963 | Japan................................. 260/458 |

*Primary Examiner*—Bernard Helfin
*Assistant Examiner*—Nicky Chan
*Attorney, Agent, or Firm*—Joseph G. Kolodny; Edward McC. Roberts; Prabodh I. Almaula

[57] ABSTRACT

New polyglycol compounds are provided which are amphoteric derivatives of polyglycol compounds containing (a) an aliphatic hydrocarbon residue containing 12 to 24 carbon atoms, which is bound to nitrogen, and (b) $-(CH_2-CH_2-O-)_k$ groups bound to nitrogen, where k is a whole positive number, the molecule containing in all 4 to 12 $-CH_2-CH_2-O-$ groups, which polyglycol compounds are, on one hand, quaternated with organic halogen compounds and esterified with at least dibasic oxygen acids with formation of acid ester groups.

The compounds of the present invention are especially useful as dyeing auxiliaries, and more particularly, as levelling agents for the dyeing of wool.

6 Claims, No Drawings

SULFATE DERIVATIVES OF POLYGLYCOL COMPOUNDS

This is a continuation of application Ser. No. 833,866, filed on June 3, 1969 now abandoned, which is a streamlined continuation of application Ser. No. 533,774, filed Mar. 14, 1966, now abandoned.

The present invention provides new polyglycol compounds suitable for use as dyeing auxiliaries. These compounds are amphoteric derivatives of polyglycol compounds containing a. an aliphatic hydrocarbon residue containing 12 to 24 carbon atoms, which is bound to nitrogen, and
b. -(CH$_2$-CH$_2$-O-)$_k$ groups bound to nitrogen, where k is a whole positive number, the molecule containing in all 4 to 12 -CH$_2$-CH$_2$-O- groups, which polyglycol compounds are, on one hand, quaternated with organic halogen compounds and, on the other hand, esterified with at least dibasic oxygen acids with formation of acid ester groups. These new amphoteric polyglycol compounds are advantageously obtained when glycol compounds which contain α an aliphatic hydrocarbon residue containing 12 to 24 carbon atoms, which is bound to nitrogen,
β(-CH$_2$-CH$_2$-O)$_k$-H groups [where k is a whole positive number] bound to nitrogen, the molecule containing a total of 4 to 12 -CH$_2$-CH$_2$-O-groups, and
γ exclusively tertiary amino groups are quaternated, on one hand, with organic halogen compounds and, on the other hand, esterified on at least one -CH$_2$-CH$_2$-OH group to form an acid ester derived from an at least dibasic oxygen acid.

The polyglycol compounds contain advantageously 6 to 9 -CH$_2$-CH$_2$-O-groups (ethenoxy groups), and also saturated or unsaturated aliphatic hydrocarbon residues, which may be branched or preferably are linear, and contain advantageously 16 to 18 carbon atoms. The quaternation and esterification may be carried out in either order. The -CH$_2$-CH$_2$-OH groups are esterified with functional derivatives of dibasic or polybasic oxygen acids under conditions such that at least one acid ester group, preferably in the form of an alkali metal salt or ammonium or amine salt thereof, is introduced.

A preferred sub-group of the new polyglycol derivatives, which is distinguished by their particularly easy accessibility, are the quaternary compounds derived from organic, halogen-containing quaternating agents and from acid esters of the formula (I) 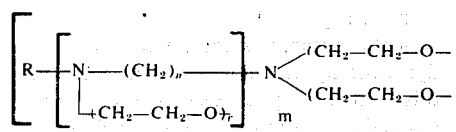

in which R represents a preferably linear aliphatic hydrocarbon residue containing 12 to 24 carbon atoms, X the residue formed when a hydroxyl group is eliminated from a polybasic organic or inorganic oxygen acid, which residue is advantageously in the form of an alkali metal or ammonium or amine salt thereof; m = 0 or 1, n = 2 or 3, s is a whole number from at least 1 to at most 2+m, and p, q, and r are whole numbers, the sum (p + q + r) being from 4 to 12, preferably from 6 to 9.

The amphoteric polyglycol compounds of the formula (I) are obtained when a nitrogen-containing polyglycol compound of the formula (II) 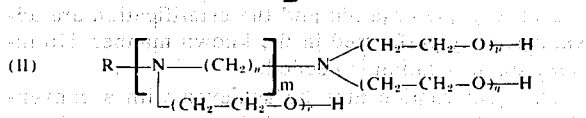

(where R, n, m, p, q and r have the same meanings as in formula I) are in either order of succession, on one hand, quaternated with organic halogen compounds and, on the other hand, esterified on at least one -CH$_2$CH$_2$-OH group to form an acid ester derived from an at least dibasic oxygen acid, and the reaction conditions are advantageously chosen so that the acid ester groups are introduced in the form of their alkali metal or ammonium or amine salts.

Suitable starting materials for the manufacture of the new polyglycol compounds of this invention, which contain both acid ester groups and quaternary ammonium groups are above all basic polyglycol ethers of the formula (III) 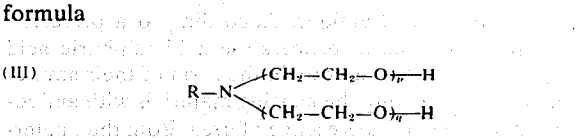

where R represents a preferably linear aliphatic hydrocarbon residue containing 12 to 24, preferably 16 to 20, carbon atoms, and p and q are whole numbers, the sum (p+q) being from 4 to 12, preferably from 6 to 9.

As compounds of the formula (III) there may be mentioned, for example: The reaction product of 1 mol of dodecylamine with about 6 mols of ethylene oxide, or of 1 mol of oleylamine with 6, 8 or 12 mols of ethylene oxide, or of 1 mol of palmityl-, stearyl-, arachidylamine or behenylamine with 4, 8 or 12 mols of ethylene oxide, or reaction products of mixtures of such amines with 4 to 12 mols of ethylene oxide per mol of amine mixture.

Furthermore, there are specially suitable polyglycol compounds of the formula (IV)

(IV) 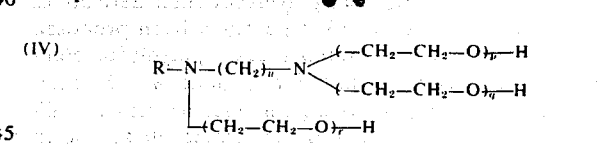

where R represents a preferably linear aliphatic hydrocarbon residue containing 12 to 24, preferably 16 to 18, carbon atoms, n = 2 or 3, and p, q and r are whole numbers, the sum (p+q+r) being from 4 to 12, preferably from 6 to 9.

As compounds of the formula (IV) there may be mentioned, for example: The reaction product of monoalkyl-propylenediamine, whose alkyl radical corresponds to the residue of tallow fatty acid, with 8 mols of ethylene oxide and the reaction product of monoalkyl-propylenediamine, whose alkyl radical is linear and contains 16 to 18 carbon atoms, with 6 mols of ethylene oxide.

Both the quaternation and the esterification are advantageously performed in the known manner. No intermediate isolation is needed.

The quaternation may be achieved with a conventional halogen-containing alkylating or aralkylating agent, such as ethylbromide or benzylchloride, though preferred quaternating agents are chloroacetamide, ethylenechlorohydrin, ethylenebromohydrin, epichlorohydrin or epibromohydrin, because their use gives rise to dyeing auxilaries having particularly good properties, especially when used as levelling agents in dyeing unwoven wool with wool dyestuffs containing acid groups.

As polybasic oxygen acids there may be used for the formation of the acid esters organic polycarboxylic acids, for example succinic-sulphonic acid or polybasic inorganic oxygen acids, such as sulphuric acid. Instead of the acids themselves there may be used their functional derivatives such as acid anhydrides, acid halides, acid esters or acid amides. According to a preferred variant of the present process the acid sulphuric acid esters are prepared directly in the form of their ammonium salts by heating the starting materials with amidosulphonic acid in the presence of urea. Both the quaternation and the partial esterification are advantageously performed by simply mixing the reactants at an elevated temperature which is advantageously from 50° to 100°C.

The polyglycol compounds of this invention obtained in this manner, which contain both quaternary ammonium groups and acid ester groups or acid ester groups in salt form, are readily water-soluble compounds having a pronounced amphoteric nature.

As mentioned above, the new polyglycol ether derivatives possess valuable technical properties when used as levelling agents in dyeing nitrogeneous fibres, especially wool, with wool dyestuffs containing acid groups imparting solubility in water, especially with reactive dyestuffs and 1:1-metal complex dyestuffs. While it is true that different types of polyglycol ether derivatives containing amino groups have already been proposed for this purpose, for example basic polyglycol compounds obtained by adding, for instance, 6 to 30 mols of ethylene oxide on to high-molecular primary aliphatic monoamines, such as oleylamine, these known levelling agents - which are generally used in an amount from about 0.1 to 8 percent by weight, advantageously 0.5 to 3 percent by weight referred to the weight of the material to be dyed - are not suitable for general use in connection with wool. Whereas the use of the levelling agents of the indicated type gives in ideal apparatus very level dyeings, there generally intervene different disturbing factors when the least advantageous apparatus is used, thus in dyeing woollen tops, especially when dyeing wool yarn in apparatus by the so-called suspension system with wool dyestuffs in the presence of the aforesaid levelling agents. Inter alia, in addition to the irksome appearance of visible scum, air bubbles are very tenaciously retained on the fibre surface; this disturbs the uniform penetration of the material to be dyed and causes a tendency of the material to rise to the surface of the bath. This is particularly noticeable as a deformation of the material when dyeing cross-wound bobbins.

Furthermore, the known levelling agents increase the adhesion between fibres and fibres so that a more or less extensive sticking together of the yarns occurs, which causes the formation of channels in the material and results in its irregular dyeing. Furthermore, the known levelling agents have the disadvantageous property that dehydration causes adducts from dyestuff and levelling agent on heating, generally below the boiling temperature, to settle out in the form of droplets (the so-called turbidity point) which are retained mechanically by the material. This phenomenon, referred to as the draining effect, may lead to irregular dyeings that are not resistant to rubbing.

It has already been proposed to remedy these disadvantageous properties of the known levelling agents by the addition of special combination preparations, for example mixtures of paraffin oil, emulsifiers and scumming agents, but the use of such products renders the dyeing operation complicated and costly.

Finally, it is also known to use as wool levelling agents compounds obtained by reacting esterifiable polyglycol compounds, whose molecule contains at least one basic nitrogen atom, a lipophilic residue and a polyglycol chain of at least 4 ethoxy groups, with sulphatizing or phosphatizing agents and to quaternate at least one tertiary nitrogen atom with dimethylsulphate. The known compounds of this composition, are however, only occasionally suitable as levelling agents for wool dyestuffs; and in addition they deform cross-wound bobbins.

Unexpectedly it has been found that the new polyglycol compounds of this invention are free from all the aforesaid disadvantages of the know levelling agents in dyeing wool; this means that there are now for the first time available levelling agents which, on simple addition to the dyebath, satisfy all practical requirements and render unnecessary the additional use of auxilaries that render the dyeing operation complicated and costly.

Accordingly, the present invention includes also a process for dyeing nitrogenous fibres suitable for dyeing with acid dyestuffs, especially for dyeing wool, the said fibres being treated in an aqueous medium with dyestuffs containing acid groups imparting solubility in water, especially sulphonic acid groups, in the presence of the above-defined new, amphoteric polyglycol ether compounds as levelling agent.

The present dyeing process may be used for dyeing any nitrogenous fibres that can be dyed in the usual manner with acid dyestuffs, for example silk, polyamide fibres from s-caprolactam or those from adipic acid and hexamethylenediamine. The process is particularly advantageously applied to the dyeing of wool, possibly mixed with other fibres which may contain or be free from nitrogen.

In the present process wool yarn is dyed with wool dyestuffs by the generally practised wool dyeing methods. There may be used the conventional wool dyestuffs that contain at least one acid group imparting solubility in water, that is to say a carboxylic acid group or sulphonic acid group that does not participate in the formation of a metal complex, for example acid wool dyestuffs free from metal bound in a complex union, also chromium complex compounds containing sulphonic acid groups of monoazo dyestuffs in which 1 atom of chromium is bound in complex union with 1 molecule of azo dyestuffs, also phthalocyanine dyestuffs containing sulphonic acid groups and especially water-soluble reactive dyestuffs.

The preferably used reactive dyestuffs must contain at least one group capable of reacting with the nitrogenous fibre, or a reactive substituent. In other respects they may belong to a wide variety of types of dyestuffs, for example the stilbene dyestuffs, perinone dyestuffs, peridicarboxylic acid imide dyestuffs, nitro dyestuffs, triphenylmethane dyestuffs, phthalocyanines and above all the acid anthraquinone and azo dyestuffs, including metal-free, metallizable and metalliferous monoazo and polyazo dyestuffs which contain groups or a substitutent capable of reacting with the nitrogenous fibres. The dyestuffs contain at least one, as a rule two or more, acid groups imparting solubility in water. As a rule, particularly valuable results are obtained with dyestuffs that contain three sulphonic acid groups.

From among the above-mentioned reactive groups or substituents of the reactive dyestuffs there may be mentioned, for example, the ethylenimide groups, epoxide groups, the vinyl grouping in a vinylsulphone group or in the acrylic acid residue, and above all those labile substituents which are easy to eliminate with entrainment of the bond electron pair.

As labile substituents eliminable with entrainment of the bond electron pair there may be mentioned, for example, aliphatically bound phosphoric or sulphuric acid ester groups, sulphonic acid fluoride groups, aliphatically bound sulphonyloxy groups and above all halogen atoms, especially a mobile chlorine atom. These labile substitutents are advantageously in position γ or β of an aliphatic residue which is bound with the dyestuff molecule either directly or through an amino, sulphone or sulphonamide group. In the reactive dyestuffs that contain as labile substituents halogen atoms, these mobile halogen atoms may also be contained in an aliphatic acyl residue (for example in the β-position of a propionyl residue) or preferably in a heterocyclic system, and in the last-mentioned case there are suitable dyestuffs containing a monohalogenated heterocyclic system, for example a monochlorinated 1,3,5-triazine residue, such as the 1,3,5-triazine residue of the formula

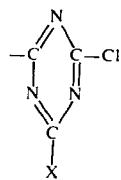

(where X represents an alkyl, aryl, aralkyl, alkylmercapto or arylmercapto residue, or preferably a possibly substituted amino group or a preferably substituted hydroxyl group)
as well as dyestuffs containing a dichlorotriazine residue or dyestuffs containing a dichloropyrimidine residue. Further suitable are reactive dyestuffs containing α-bromo- or α-chloroacrylamino groups with 2,3-dichloroquinoxylinoyl, dihalogenophthalazine, dichloropyridazone, 2-chlorothiazole, propionylsulphone residues or residues of the formulae -CH$_2$-NH-OC-alkyl-dihalogen, -CH$_2$NH-OC-alkenyl-halogen or -NH-SO$_2$-CH$_2$-CH$_2$-O-SO$_3$H.

The reactive dyestuffs of the kind defined above are accessible by known methods, for example from dyestuff components containing the said labile substituents or a residue containing such labile substituents, by incorporation in the dyestuff molecule by a known method after the dyestuff has been manufactured. Thus, on reaction of azo or anthraquinone dyestuffs containing a reactive hydroxyl, mercapto or above all amino groups, with, for example chloroacetylchloride, with β-bromo- or β-chloropropionylchloride or chloropropionic acid anhydride, with cyanuric chloride or with a primary condensation product from cyanuric chloride containing two chlorine atoms and instead of the third chlorine atom of cyanuric chloride or organic residue, there are obtained reactive dyestuffs that further contain a mobile chlorine atom. Such reactive dyestuffs, which contain a sulphonylated hydroxyl group, can be prepared, for example, by reacting 1 mol of a dyestuff which contains a hydroxyalkyl group (for example a sulphonic acid-N-hydroxyalkylamide group or a β-hydroxyalkylsulphonic acid) with at least one mol of an organic sulphenylhalide, for example para-toluenesulphonyl chloride, benzenesulphonyl chloride or ethanesulphonyl chloride, or with concentrated sulphuric acid or with chlorosulphonic acid in a manner such that the hydroxy group is acylated.

The amounts of the ingredients of the aqueous dyebaths to be used in the present dyeing process may vary within relatively wide limits. The amount of dyestuff depends, of course, on the desired tinctorial strength. It is advantageous to use 0.25 to 6 percent, preferably 0.5 to 3 percent, of the nitrogeneous compound referred to the weight of the wool to be dyed.

However, even in the case of light shades, for which less than 1 percent dyestuff referred to the weight of the fibre is used, the amount of the nitrogen substance should be at least 0.25 percent, likewise referred to the weight of the fibre.

Furthermore, it is advantageous to dye in an acid bath so that the dyebath should have a pH within the range from about 2 to 6. This pH value may be adjusted by adding acetic acid, or if desired formic or sulphuric acid. It is advantageous to add to the dyebath also sodium sulphate.

As is usual in dyeing nitrogenous fibres, especially wool, dyeing is carried out at an elevated temperature; it is advantageous to start the actual dyeing process at about 50° to 80°C. then heating the bath to 70° to 80°C or to the boil, and continuing and completing the dyeing process at this temperature.

To ensure that the effect of the nitrogenous compound is achieved from the start, it is advantageous to immerse the material to be dyed in the dyebath — which contains acid, if desired sodium sulphate, as well as the auxiliary, that is to say the nitrogenous compound — at room temperature or at an at most slightly higher temperature, then to heat the dyebath and to add the dyestuff in the form of an aqueous solution at an elevated temperature, for example at 50 to 80°C.

Unless otherwise indicated, parts and percentages in the following Examples are by weight.

EXAMPLE 1

580 Parts (1 mol) of the adduct from 1 mol of a commercial fatty amine (tallow fatty amine; containing 35 percent of hexadecylamine, 25 percent of octadecylamine and 45 percent of octadecenylamine) with about 7 mols of ethylene oxide are heated to 60° to 65°C.

In the course of 30 minutes 145 parts of chloroacetamide, then within 15 minutes 107 parts of urea and within 30 minutes 107 parts of amidosulphonic acid are stirred in. The batch is heated within one hour to 95°C, stirred for 6 hours at 95° to 98°C and dissolved in 600 parts of water, to yield a solution of about 50 percent (= Preparation A) which contains the compound

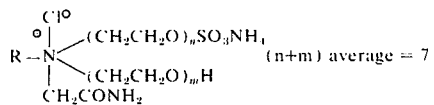

in which R represents the hydrocarbon residue of tallow fatty amine.

EXAMPLE 2

580 Parts (1 mol) of the adduct from one mol of a commercial fatty amine (containing 35 percent of hexadecylamine, 25 percent of octadecylamine and 45 percent of octadecenylamine) and about 7 mols of ethylene oxide are heated to 90°C.

In the course of about 15 minutes 120 parts of ethylenechlorohydrin are stirred in and the whole is quaternated for 24 hours at 120°C. At about 60°C there are then added 107 parts of urea and 107 parts of amidosulphonic acid, and the batch is heated for another 6 hours at about 95°C. The contents of the reactor are dissolved in 600 parts of water, to yield a 50 percent solution (= Preparation B) which contains the ammonium salt of the monosulphuric acid ester of the compound

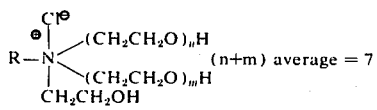

in which R represents the hydrocarbon residue of tallow fatty amine.

EXAMPLE 3

368 Parts (1 mol) of a commercial alkylpropylenediamine of the formula R-HN-(CH$_2$)$_3$-NH$_2$, where R is the hydrocarbon residue corresponding to soybean fatty amine, are reacted with 352 parts (8 mols) of ethylene oxide.

144 Parts (= one fifth of the total amount obtained) of this adduct are heated to 60° to 65°C. 50 Parts of chloroacetamide are stirred in within 30 minutes, and the whole is heated for 10 hours at 95° to 100°C, then cooled to 60°C, and within 15 minutes mixed with 22.4 parts of urea and then within 30 minutes with 22.4 parts of amidosulphonic acid. The whole is then heated for 6 hours at 95° to 98°C and dissolved in 290 parts of water, to yield a 40 percent solution (= Preparation C) which contains the ammonium salt of the acid monosulphuric acid ester of the compound

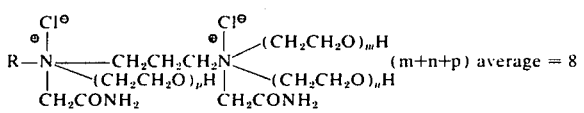

in which R represents the residue of soybean fatty amine.

EXAMPLE 4

The procedure is as described in Example 1, except that the chloroacetamide is replaced by an equal quantity (= 145 parts) of epichlorohydrin, to yield an approximately 50 percent solution (= Preparation D) which contains the ammonium salt of the monosulphuric acid ester of the compound of the formula

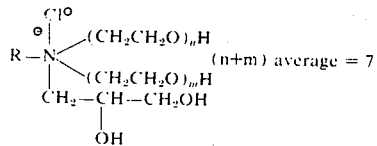

where R represents the hydrocarbon residue of tallow fatty amine.

EXAMPLE 5

93.5 Parts (1 mol) of chloroacetamide is stirred at 60° to 65°C into 500 parts of the adduct described in the first paragraph of Example 1, and the whole is treated for 24 hours on a boiling waterbath.

At 60° to 65°C there are then added 214 parts of urea and 214 parts of amidosulphonic acid and the mixture is esterified for 6 hours on a boiling waterbath. The reaction mixture is then dissolved in 440 parts of water, to form a solution of approximately 50 percent strength (= Preparation E) which contains the compound

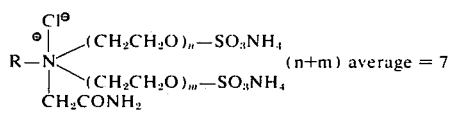

in which R represents the residue of tallow fatty amine.

EXAMPLE 6

480 Parts (1 mol) of an adduct obtained from one mol of a commercial tallow fatty amine (containing 35 percent of hexadecylamine, 25 percent of octadecylamine and 45 percent of octadecenylamine) and 4 mols of ethylene oxide are quaternated with 145 parts of chloracetamide for 6 hours at 100° to 105°C. 107 Parts of urea and 214 parts of amidosulphonic acid are then added at 60°C; the mixture is esterified for 6 hours at 100° to 105°C, then dissolved in 660 parts of water, to furnish a 40 percent solution (= Preparation F) containing the compound

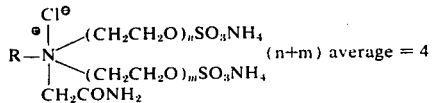

where R represents the residue of tallow fatty amine.

EXAMPLE 7

The procedure is as described in Example 6, except that 795 parts (1 mol) of the adduct from tallow fatty amine and 11 mols of ethylene oxide are used. After quaternation and esterification the batch is dissolved in 1220 parts of water, to form an approximately 50 percent solution (= Preparation G) containing the compound

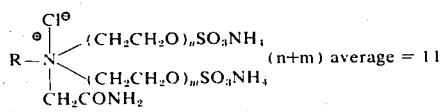

where R represents the residue of tallow fatty amine.

EXAMPLE 8

665 Parts (1 mol) of an adduct from one mol of a commercial fatty amine (containing about 10 percent of stearylamine, 55 percent of arachidylamine and 35 percent of behenylamine) and 8 mols of ethylene oxide are quaternated with 145 parts of chloroacetamide for 12 hours at 100° to 105°C. At 80°C 107 parts of urea and 214 parts of amidosulphonic acid are gradually added; the whole is esterified for 6 hours at 100° to 105°C and dissolved in 760 parts of water, to form an approximately 50 percent paste (= Preparation H) containing the compound

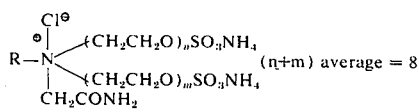

where R represents the residue of tallow fatty amine.

EXAMPLE 9

The procedure is as described in Example 1, except that the chloroacetamide is replaced by 196 parts of epibromohydrin. After the reaction with epibromohydrin and amidosulphonic acid 635 parts of water are added, to form an approximately 50 percent solution (= Preparation I) containing the ammonium salt of the monosulphuric acid ester of the compound

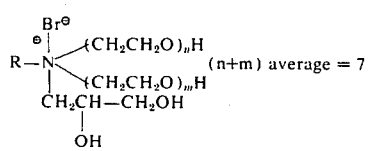

where R represents the hydrocarbon residue of tallow fatty amine.

EXAMPLE 10

The procedure is as described in Example 2, except that the ethylenechlorohydrin is replaced by 188 parts of ethylenebromohydrin and the mixture is quaternated for 24 hours at 105° to 110°C, to form an approximately 50 percent solution (= Preparation K) containing the ammonium salt of the acid monosulphuric acid ester of the compound

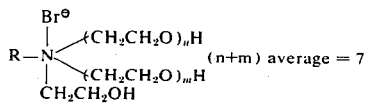

where R represents the hydrocarbon residue of tallow fatty amine.

EXAMPLE 11

580 Parts of the adduct, described in the first paragraph of Example 1, are quaternated with 145 parts of chloracetamide for 12 hours at 100° to 105°C and then dissolved in 500 parts of anhydrous pyridine.

The resulting solution is slowly stirred into a solution, prepared at 5°C, for 256 parts of chlorosulphonic acid in 1400 parts of anhydrous pyridine. The batch is heated for 3 hours at 40° to 45°C, then neutralized at 20° to 30°C with 30 percent sodium hydroxide solution, suction-filtered, and the volatile constituents are expelled from the filtrate by distillation under vacuum. The residue is dissolved in 820 parts of water, to form a product (= Preparation L) which contains about 50 percent of the compound

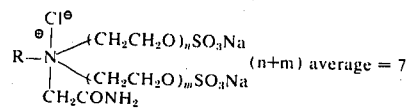

where R represents the residue of tallow fatty amine.

EXAMPLE 12

580 Parts (1 mol) of the adduct described in the first paragraph of Example 1 are quaternated with 122 parts of chloroacetamide for 24 hours at 95 to 100°C. At 80°C 108 parts of maleic anhydride are added within 30 minutes and the batch is heated for 30 minutes at 100°C and then for 30 minutes at 120°C. 780 Parts of water and 200 parts of sodium sulphite are then added at 95° to 100°C, and the batch is heated for another hour at 95° to 100°C, to form a paste (= Preparation M) which contains about 50 percent of the compound

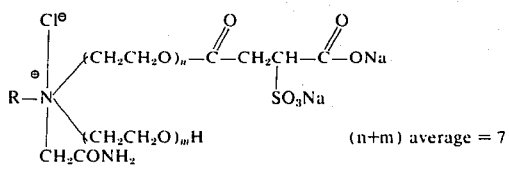

where R represents the residue of tallow fatty amine.

EXAMPLE 13

100 Kilograms of wool yarn are prewetted in 2000 liters of water for 10 minutes at 50°C in a hank dyeing machine; there are then added 1.5kg of glacial acetic acid, 10kg of crystalline sodium sulphate, 2kg of the preparation A of Example 1 and 1kg of the red dyestuff of the formula

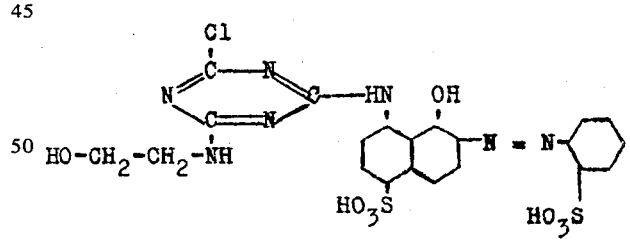

within 45 minutes the temperature is raised to the boil and dyeing is performed for 1 hour at the boil. The whole is then cooled, the yarn rinsed in cold water and dried, to furnish a level red dyeing.

By virtue of the special properties of Preparation A there occur during the dyeing operation no deformations of the material packing, no channel formation, no scum and no floating of the yarn being dyed. Fine worsted yarns do not undergo felting.

The adduct Preparation A + reactive dyestuff always remains water-soluble so that no precipitations occur nor do dehydration phenomena (the so-called draining effect) intervene.

Similar results are obtained with the dyestuffs of the following formulae:

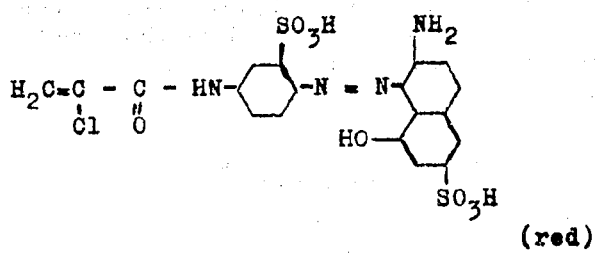

(red)

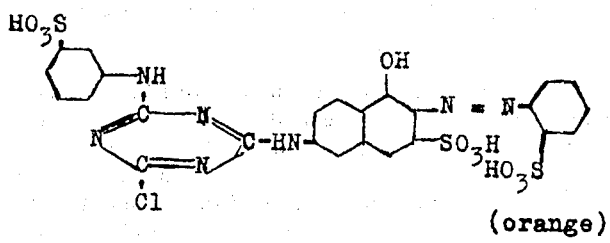

(orange)

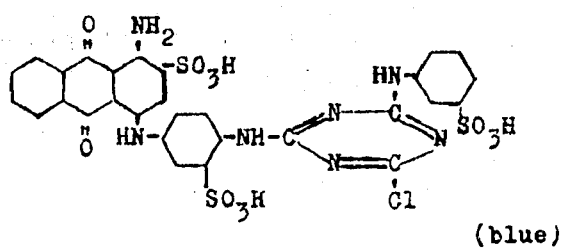

(blue)

EXAMPLE 14

In an apparatus for dyeing cross-wound bobbins 100kg of cross-wound bobbins of pre-chlorinated wool yarn are wetted with 1500 liters of water at 50°C for 10 minutes. Then the following additions are made: 3kg of acetic acid of 80 percent strength, 10kg of crystalline sodium sulphate, 1.5kg of the Preparation B of Example 2 and 3kg of the red dyestuff of the formula

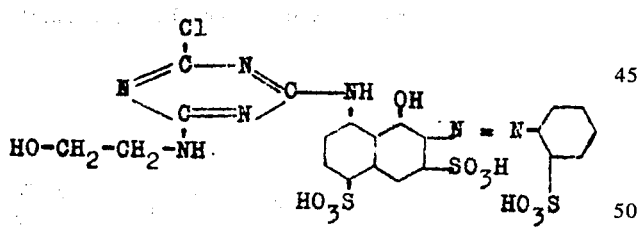

within 60 minutes the temperature is raised to the boil and the yarn is boiled for 1 hour. The steam is then turned off, 3.2kg of ammonia of 25 percent strength are added, and the yarn is treated in the cooling dyebath for 20 minutes, then thoroughly rinsed and in the last rinsing bath acidified with 2kg of formic acid of 85 percent strength for 10 minutes. Finally, the cross-wound bobbins are dehydrated and dried. The yarn is dyed a fast, brilliant red shade.

During the dyeing process no scum forms and the cross-wound bobbins are not deformed. No disturbance of the circulation of the dye liquor due to channel formation occurs so that the resulting dyeing is perfectly level.

Advantageous results are also obtained when in this Example Preparation B is replaced by an equal quantity of Preparation A (Example 1), C (Example 3), D (Example 4) or E (Example 5) or the dyestuff shown in Example 6.

EXAMPLE 15

4 Pieces of wool fabric, totalling 100kg, are wetted in a winch vat in 4000 liters of water at 50°C. The following additions are then made: 5kg of sulphuric acid of 98 percent strength, 10kg of crystalline sodium sulphate, 2kg of Preparation C of Example 3 and 0.46kg of the 1:1-chromium complex of the dyestuff of the formula

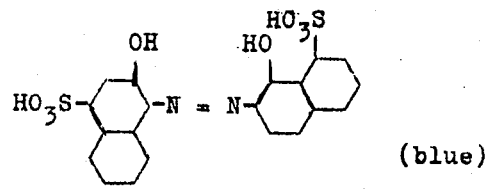

(blue)

0.40kg of the 1:1-chromium complex of the dyestuff of the formula

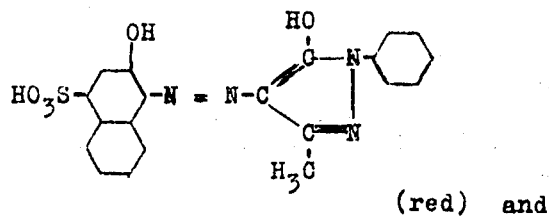

(red) and 0.21kg of the 1:1-chromium complex of the dyestuff of the formula

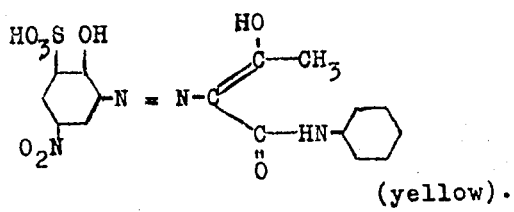

(yellow).

The whole is heated to the boil within 45 minutes and then boiled for 1 hour, then slowly cooled by running in cold water, thoroughly rinsed, centrifuged and dried. The woollen pieces are dyed a grey shade of good surface and fibre levelness. During the dyeing the pieces do not tend to float but always remain inside the dye liquor (with the exception, of course, of the path over the dye winch). Furthermore, no precipitations occur.

EXAMPLE 16

100 Kilograms of loose wool (flocks) are wetted in 2000 liters of water at 50°C in a circulation vat. The following additions are then made: 2kg of glacial acetic acid, 10kg of crystalline sodium sulphate, 2kg of Preparation D of Example 4, and 1kg of the blue dyestuff of the formula

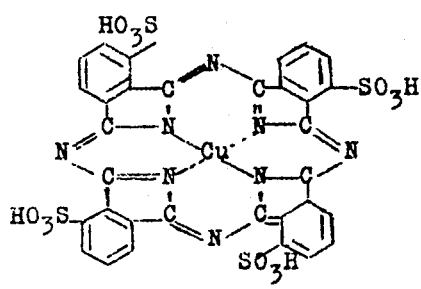

The whole is heated within 60 minutes to the boil and then boiled for 60 minutes, and the wool is then rinsed and dried. The wool is dyed a level turquoise shade of good fastness properties. During the dyeing no disturbing scum forms. Since by virtue of the special behaviour of Preparation D no channels are formed in the material block, the resulting levelness is excellent.

EXAMPLE 17

A machine for dyeing cross-wound bobbins is packed with 100kg of cross-wound bobbins of pure wool yarn. In the dye liquor container associated with this machine a dye liquor is prepared from 1200 liters of water at 50°C
5 kg of sodium sulphate
2 kg of glacial acetic acid
1 kg of the dyestuff of the formula shown in Example 16 and finally
1 kg of Preparation D of Example 4 is added.

This dye liquor is pumped into the machine for dyeing cross-wound bobbins mentioned above, heated within 40 minutes to the boil and the whole is boiled for 1 hour; the yarn is then thoroughly rinsed and dried. It is dyed a level turquoise shade of good fastness properties. During the dyeing operation the cross-wound bobbins are not deformed and no channels form in the material.

EXAMPLE 18

100 Kilograms of wool yarn in the form of cross-wound bobbins are wetted in 2000 liters of water at 50°C for 10 minutes in a machine for dyeing cross-wound bobbins. The following additions are then made: 6kg of sulphuric acid of 96 percent strength, 10kg of crystalline sodium sulphate, 1kg of Preparation A of Example 1 and 1kg of the red dyestuff of the formula

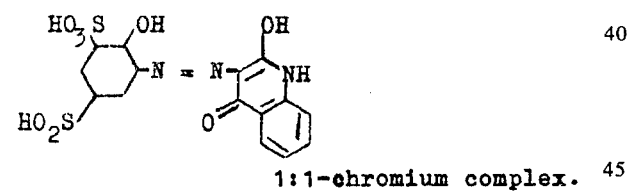
1:1-chromium complex.

Within 30 minutes the temperature is raised to 80°C and the yarn is dyed at this temperature for 1 hour, then rinsed and buffered with sodium acetate. The wool yarn is dyed a level, fast, red shade. The cross-wound bobbins are not deformed.

Instead of Preparation A there may be used Preparation F or L. With equally good results the dyestuffs of the following formula may be used:

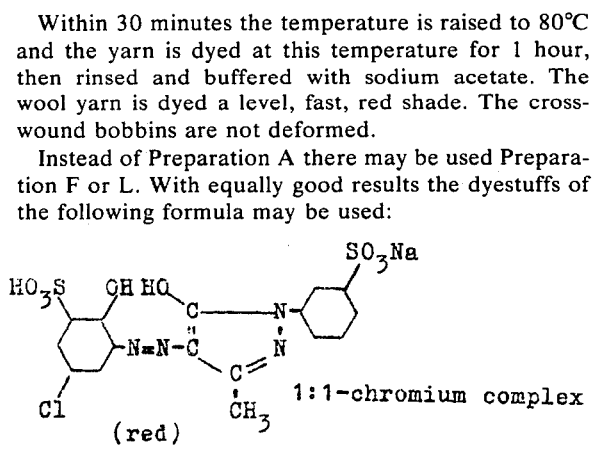
(red) 1:1-chromium complex

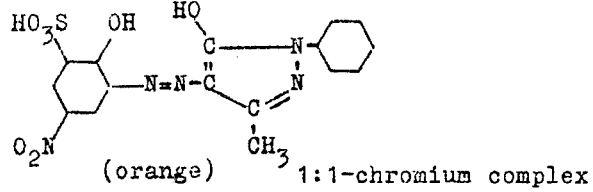
(orange) 1:1-chromium complex

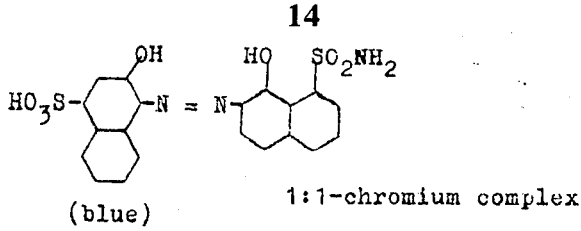
(blue) 1:1-chromium complex

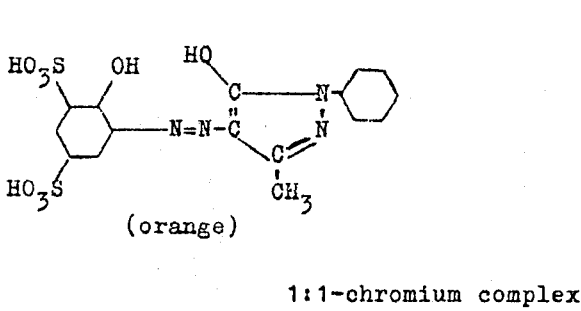
(orange) 1:1-chromium complex

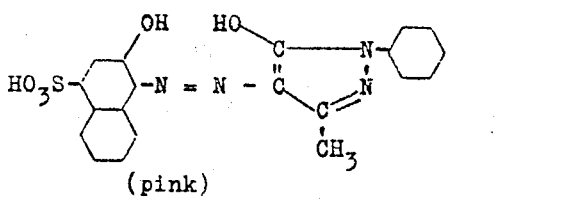
(pink) 1:1-chromium complex

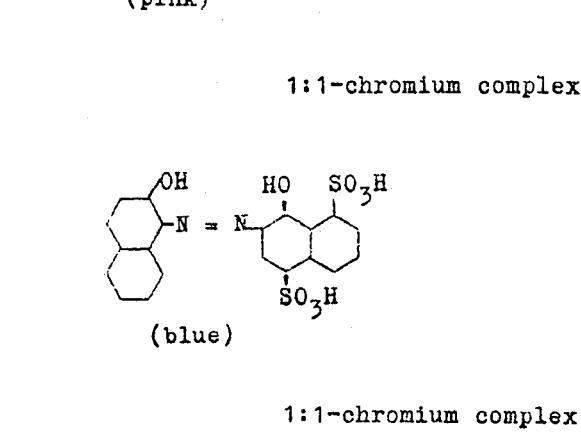
(blue)
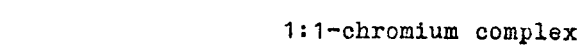
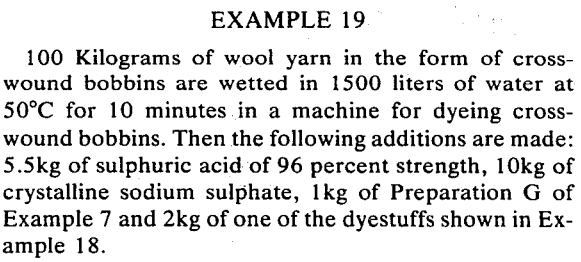
1:1-chromium complex

EXAMPLE 19

100 Kilograms of wool yarn in the form of cross-wound bobbins are wetted in 1500 liters of water at 50°C for 10 minutes in a machine for dyeing cross-wound bobbins. Then the following additions are made: 5.5kg of sulphuric acid of 96 percent strength, 10kg of crystalline sodium sulphate, 1kg of Preparation G of Example 7 and 2kg of one of the dyestuffs shown in Example 18.

The temperature is raised to the boil within 50 minutes and the yarn is boiled for 1 hour, then thoroughly rinsed. The wool yarn is dyed a fast, level, blue shade. The dyeing operation does not deform the cross-wound bobbins. Instead of Preparation G there may be used Preparation H or M.

EXAMPLE 20

100 Kilograms of wool yarn are pre-wetted in 2,000 liters of water with addition of 2kg of acetic acid of 80 percent strength and 1kg of Preparation A for 10 minutes in a hank dyeing machine, whereupon 1kg of the dyestuff of the formula

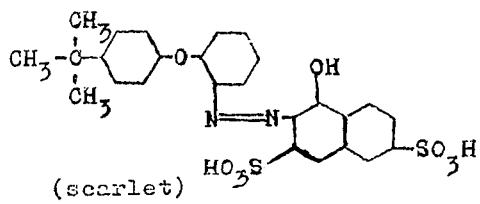

(scarlet)

is added. The temperature is raised within 30 minutes to 70°C and the yarn is dyed for 60 minutes at this temperature, then rinsed and dyed. The wool yarn is dyed a level, fast red shade. The dyestuff used above may be replaced by one of the following dyestuffs:

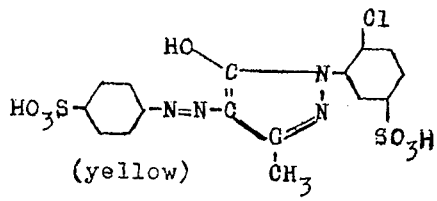

(yellow)

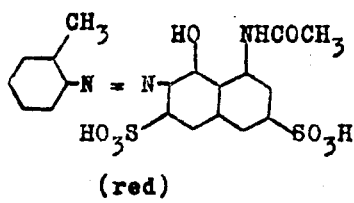

(red)

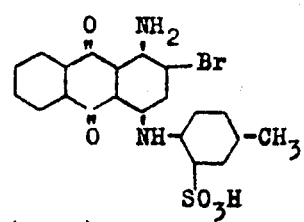

(blue)

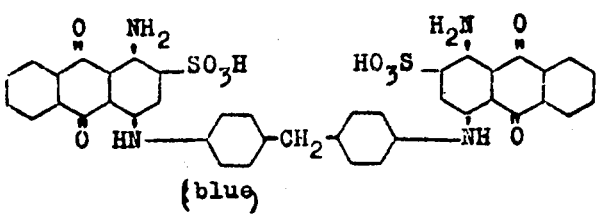

(blue)

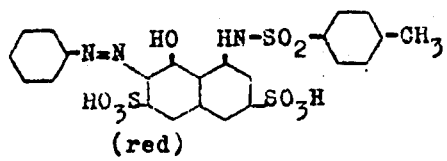

(red)

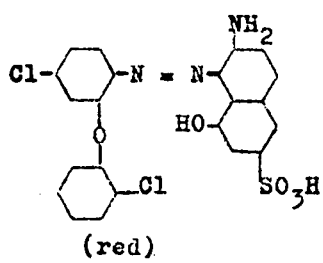

(red)

EXAMPLE 21

100 Kilograms of wool yarn are pre-wetted in 2000 liters of water at 50°C with addition of 2kg of acetic acid of 80 percent strength, 10kg of crystalline sodium sulphate and 2kg of Preparation J for 10 minutes in a single-tier hank dyeing machine, whereupon 1kg of the reactive dyestuff of the formula

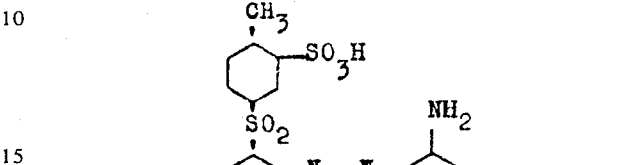

(red)

is added. The whole is raised to the boil within 40 minutes and boiled for one hour. The 3kg of ammonia of 25 percent strength are added, the yarn is treated for 20 minutes in the cooling-off dyebath, rinsed and in the last rinse acidified with 1kg of formic acid of 85 percent strength.

A fast, vivid and level red shade is obtained. Instead of the dyestuff used above there may be used the following dyestuff:

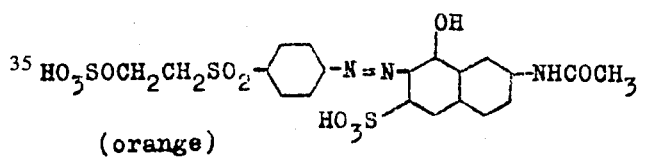

(orange)

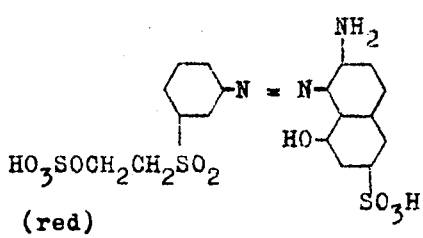

(red)

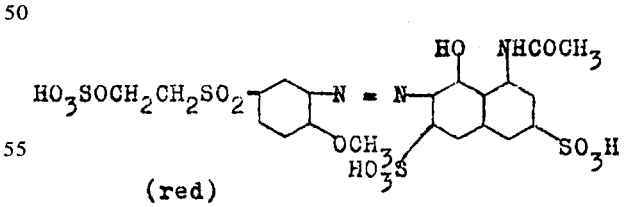

(red)

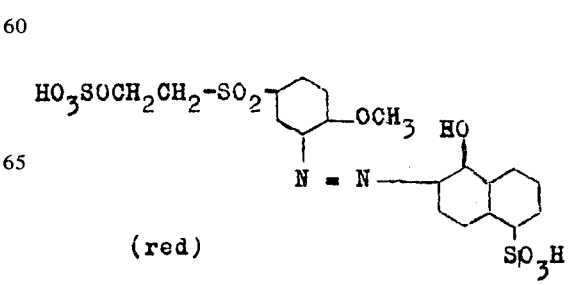

(red)

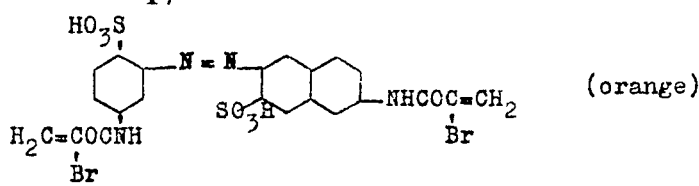
(orange)

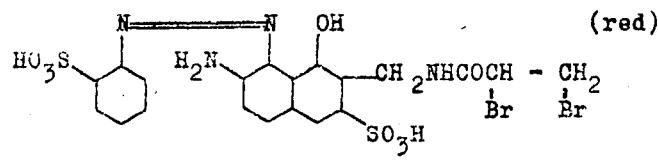
(red)

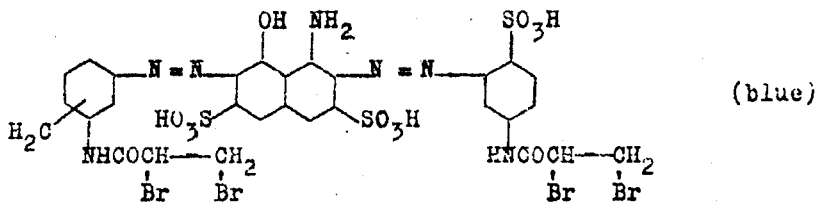
(blue)

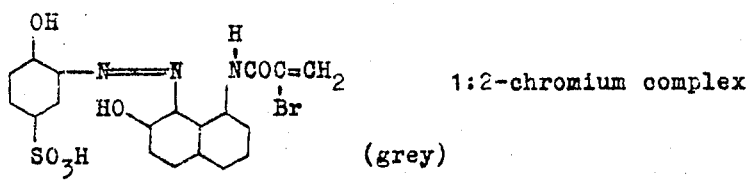
1:2-chromium complex
(grey)

EXAMPLE 22

100 Kilograms of wool yarn cross-wound bobbins are pre-wetted in 2000 litres of water with addition of 2kg of Preparation K, 2kg of acetic acid of 80 percent strength and 10kg of crystalline sodium sulphate for 10 minutes at 50°C in a machine for dyeing cross-wound bobbins. Then 2kg of the dyestuff of the formula

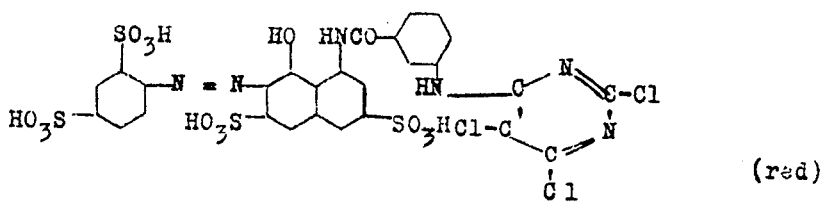
(red)

are added.

The whole is heated to the boil within 30 minutes and boiled for one hour, then rinsed and dried. The wool yarn is dyed a level and fast shade. During the dyeing operation the cross-wound bobbins are not deformed.

We claim:

1. An amphoteric compound of the formula

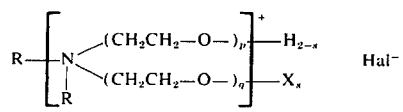

wherein

R is a linear aliphatic hydrocarbon radical selected from the group consisting of alkyl and alkenyl radicals with 12 to 24 carbon atoms, X is a radical selected from the group consisting of monodeshydroxy polybasic oxygen acid radical of an at least dibasic oxygen acid selected from the group consisting of sulfuric acid and succinic-sulfonic acid and the alkali metal and ammonium salt of said monodeshydroxy oxygen acid radical, R' is $NH_2C(=O)CH_2-$, $HOCH_2CH_2-$ or $HOCH_2CH(OH)CH_2-$ $Hal^-$ is chloride or bromide p, q, and s are whole numbers, s is 1 or 2, and the sum (p+q) is 4 to 12.

2. A compound of claim 1, wherein X is a radical selected from the group consisting of the alkali metal and ammonium salts of the monodeshydroxy sulfuric acid radical.

3. A compound of claim 1, wherein X is an alkali metal salt of the monodeshydroxy succinic-sulfonic acid radical.

4. A compound of claim 1, wherein R is the hydrocarbon radical of tallow fatty amine, X is $-SO_3NH_4$, R' is $NH_2C(=O)CH_2-$, $Hal^-$ is chloride, s is 1 and the average value of p+q is about 7.

5. A compound of claim 1, wherein R is the hydrocarbon radical of tallow fatty amine, X is $-SO_3NH_4$, R' is $NH_2C(=O)CH_2-$, $Hal^-$ is chloride, s is 2 and the average value of p+q is about 7.

6. A compound of claim 1, wherein R is $H_3C-(CH_2)_{16-20}-CH_2-$, X is $-SO_3NH_4$, R' is $NH_2C(=O)CH_2-$, $Hal^-$ is chloride, s is 2 and the average value of p+q is about 8.

* * * * *

UNITED STATES PATENT OFFICE
CERTIFICATE OF CORRECTION

PATENT NO. : 3,919,283
DATED : November 11, 1975
INVENTOR(S) : Alfred Berger, et al It is certified that error appears in the above-identified patent and that said Letters Patent are hereby corrected as shown below:

Claim 1, column 17, between lines 55 and 60, the left-hand portion of the structural formula should read:

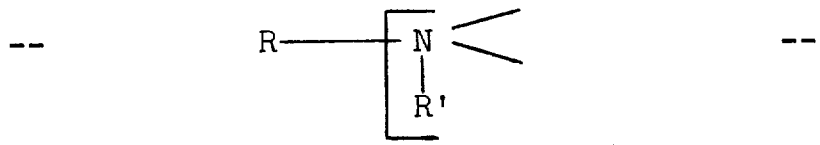

The following changes are changes which should apply to the grant only:

Column 18, line 33, "R" should read --R'--.

Claim 4, line 2, "R" should read --R'--.

Claim 5, line 2, "R" should read --R'--.

Claim 6, line 2, "R" should read --R'--.

Signed and Sealed this

Ninth Day of November 1976

[SEAL]

Attest:

RUTH C. MASON
Attesting Officer

C. MARSHALL DANN
Commissioner of Patents and Trademarks